(No Model.)  2 Sheets—Sheet 1.

F. B. MILES.
TAPER ATTACHMENT FOR LATHES.

No. 253,410. Patented Feb. 7, 1882.

Witnesses
Harry Drury
Harry Smith

Inventor
Frederick B. Miles
by his Attorney
Howson and Sons (No Model.) 2 Sheets—Sheet 2.
F. B. MILES.
TAPER ATTACHMENT FOR LATHES.
No. 253,410. Patented Feb. 7, 1882.
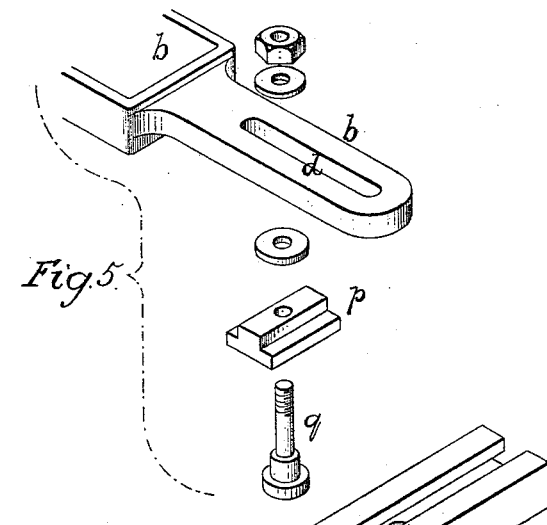
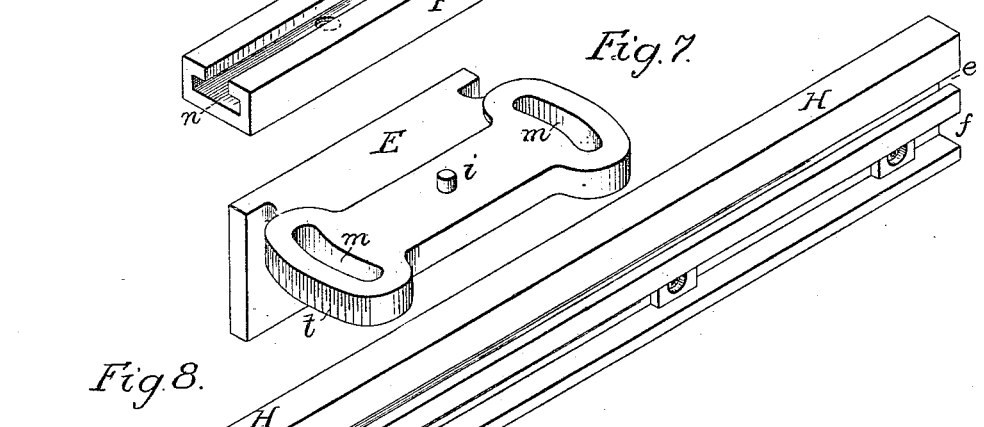
Inventor
Frederick B. Miles
by his Attorneys
Howson and Sons
Witnesses
Harry Drury Harry Smith

UNITED STATES PATENT OFFICE.

FREDERICK B. MILES, OF PHILADELPHIA, PENNSYLVANIA.

TAPER ATTACHMENT FOR LATHES.

SPECIFICATION forming part of Letters Patent No. 253,410, dated February 7, 1882.

Application filed October 22, 1881. (No model.)

*To all whom it may concern:*

Be it known that I, FREDERICK B. MILES, a citizen of the United States, residing in Philadelphia, Pennsylvania, have invented certain Improvements in Taper Attachments for Lathes, of which the following is a specification.

My invention consists of a device to be attached to a lathe for so controlling one of the slides of the slide-rest that the cutting-tool, instead of taking a direct course parallel with the axes of the head and tail stocks, will move transversely as the slide-rest is traversed, thereby imparting a tapered or other desired form to any object in the lathe, all as fully explained hereinafter.

Figure 2:
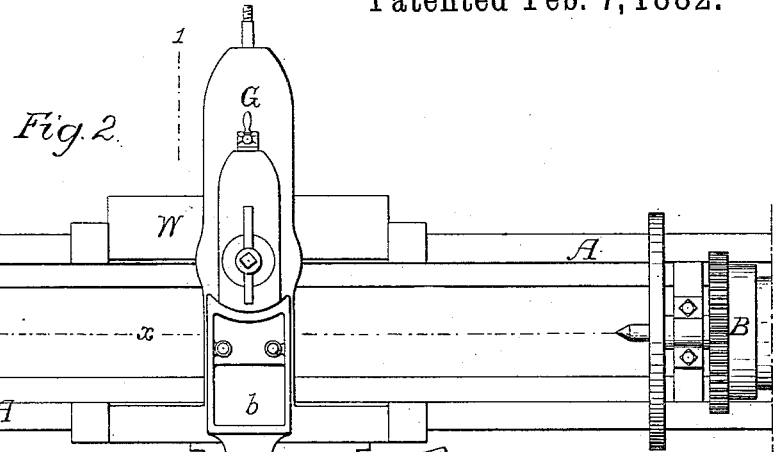
Figure 1:
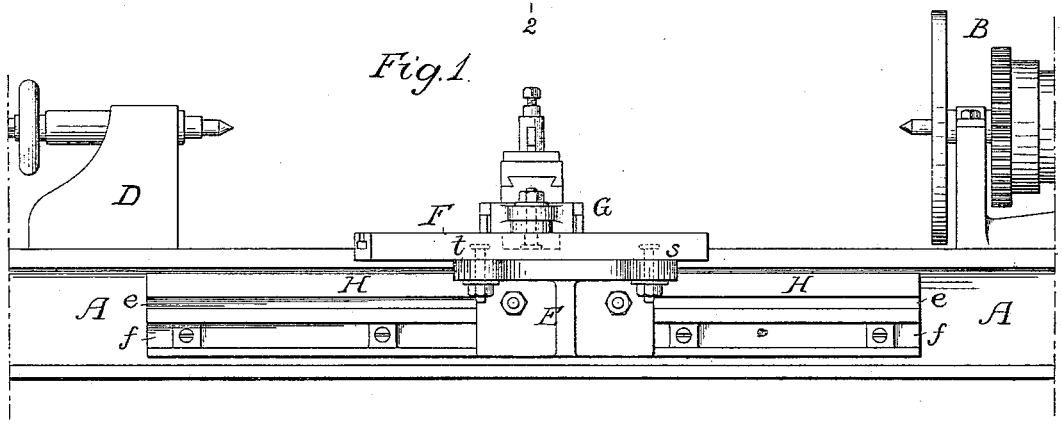
Figure 3:
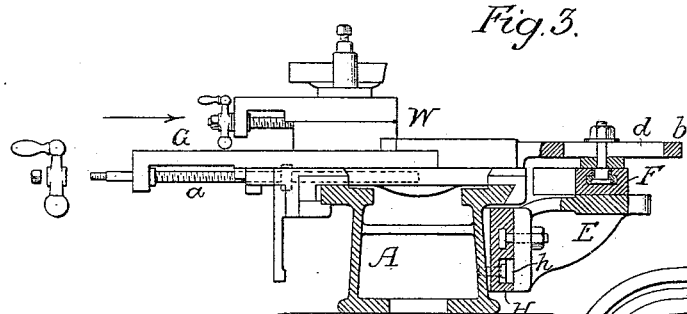
Figure 4:
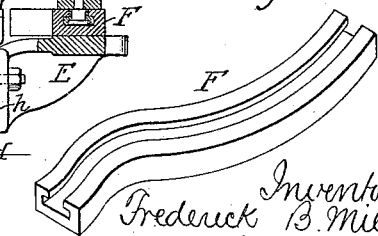

In the accompanying drawings, Figure 1 is a rear view of part of a lathe with my attachment; Fig. 2, a plan view of Fig. 1; Fig. 3, a transverse section on the line 1 2, Fig. 1; Fig. 4, a perspective view of a device which may be used in connection with my attachment; and Figs. 5, 6, 7, and 8, Sheet 2, detached perspective views, drawn to an enlarged scale, of the different parts of the attachment.

The lathe, which is of the class known as "slide" or "screw-cutting" lathes, has the usual bed, A, head-stock B, and tail-stock D. The slide-rest W is also of the usual construction, with this exception, that the slide G, Fig. 3, which admits of being moved by a screw, a, in a direction at right angles only to the bed of the lathe, has at the rear an extension, b, in which is an elongated slot, d, (best observed in the perspective view, Fig. 5,) a portion of the extension being also recessed to form a box or receptacle for chips or turnings.

To the rear side of the bed A is secured a plate or bar, H, which has a longitudinal T-shaped groove, e, Fig. 8, and below the latter a plain groove, f, for receiving the heads of the set-screws or bolts by which the bar is secured to the bed of the lathe, and also for receiving and guiding a projection, h, on a bracket, E, which is secured to the bar by bolts having T-heads adapted to the groove e. (See Fig. 3.) The top of the bracket has a central pivot-pin, i, and at each end a segmental slot, m, made in the arc of a circle, of which the pin i is the center. (See Fig. 7.) A guide-bar, F, having a T-shaped groove, n, Fig. 6, is placed on the top of the bracket E, the pivot-pin i entering a hole, j, in the bar, which is secured by bolts passing through the segmental slots in the bracket.

On the edge of each of the segmental enlargements of the bracket E is formed an index, which serves, in conjunction with a suitable pointer on the guide-bar F, to aid in the accurate adjustment of said guide-bar, one of the indexes, s, being preferably such as to indicate degrees of inclination and the other index, t, such as to indicate the amount of taper per foot of length of the object which is being turned.

A T-shaped block, p, Fig. 5, is arranged to fit snugly but slide freely in the groove n of the guide-bar F, and this block is secured by a shouldered bolt, q, and a suitable nut and washers to the extension b of the slide G of the slide-rest, the block p being free to turn on the bolt.

The guide-bar may be adjusted on the pivot-pin to any angle desired in respect to the line x, Fig. 2, drawn between the centers of the head and tail stocks; and when adjusted and secured it must control the slide G as far as the movement of the slide at right angles to the said line x is concerned, provision of course being made for freeing the slide G from the control of the usual screw, a, before the above-described attachment is put in operation. This freeing of the slide from the control of the screw a may be best accomplished by first so operating the screw that the slide will be moved to the desired extent in the direction of the arrow, Fig. 3, and then removing the handle of the screw, when the slide can be moved back independently of the screw.

As the slide-rest is traversed on the bed of the lathe the object on which the cutting-tool acts must be turned to a taper determined by the guide-bar F, and tapering objects of different sizes can be turned, as the slot d in the extension b permits the adjustment of the slide G, and consequently of the cutting-tool, from or toward the central line, x. Any object in the lathe can also be turned to a tapering form at any point throughout its entire length. As an instance, I may refer to a piston-rod, which is often made tapering at and near one end. For making this taper the attachment is used;

but the remaining portion of the rod, being cylindrical, is turned without the attachment.

The bracket E can be adjusted on the bar H to any point where the slide-rest has to be directed.

Occasionally a curved guide-bar, Fig. 4, is substituted for the straight guide-bar when objects of a shape determined by that of the bar have to be turned, the method of attachment being such as to permit the ready changing of the guide-bars.

I claim as my invention—

1. The combination, in a lathe, of the extension b of the slide G of the slide-rest with an adjustable guide-bar, F, and a block, p, adapted to the said bar and constructed for attachment to the said extension of the slide G, substantially as set forth.

2. The combination of the bracket E, constructed for attachment to the bed of a lathe, the guide-bar F, adjustable on the said bracket, the block p, adapted to the guide-bar, and the slotted extension b of the slide G of the slide-rest.

3. The combination of the bracket E, having segmental slots m m, with the guide-bar F, pivoted to the bracket and constructed for attachment to the same by bolts or screws passing through the said segmental slots.

4. The combination of the grooved bar H, constructed for attachment to the bed of a lathe, the bracket E, adjustable longitudinally on the said bar, and the guide-bar F, adjustable on the bracket, all substantially as set forth.

5. The combination of the bracket E, having segmental ends, and the indexes s and t, with the guide-bar F, pivoted to the bracket, as set forth.

In testimony whereof I have signed my name to this specification in the presence of two subscribing witnesses.

FREDK. B. MILES.

Witnesses:
HARRY DRURY,
HARRY SMITH.